United States Patent [19]
Margetts

[11] 3,823,799
[45] July 16, 1974

[54] CROSS-PULL BRAKE ACTUATOR

[75] Inventor: Hugh Grenville Margetts, Birmingham, England

[73] Assignee: Girling Limited, Birmingham, England

[22] Filed: Apr. 24, 1972

[21] Appl. No.: 246,592

[30] Foreign Application Priority Data
Apr. 27, 1971   Great Britain.................... 11624/71
Aug. 23, 1971   Great Britain.................... 39445/71

[52] U.S. Cl................ 188/78, 188/106 A, 188/329
[51] Int. Cl............................................. F16d 51/22
[58] Field of Search ............ 188/106 A, 106 F, 329, 188/330, 332, 339, 78

[56] References Cited
UNITED STATES PATENTS
2,192,004   2/1940   Burger............................ 188/106 A
2,642,159   6/1953   House............................... 188/329

FOREIGN PATENTS OR APPLICATIONS
1,022,920   1/1958   Germany....................... 188/106 A Primary Examiner—Duane A. Reger
Attorney, Agent, or Firm—Scrivener Parker Scrivener & Clarke

[57] ABSTRACT

In a cross-pull mechanical actuator for an internal shoe drum brake, an input member and a reaction member for engagement with respective, opposed brake shoes interengaged through the intermediary of a cam and follower means whereby an actuating force applied to the input member parallel with the drum axis is translated into separating movement of the said members in a direction perpendicular to the actuating force.

9 Claims, 7 Drawing Figures

PATENTED JUL 16 1974    3,823,799

CROSS-PULL BRAKE ACTUATOR

This invention relates to cross-pull brake actuators for internal shoe vehicle drum brakes.

Numerous proposals have been made for actuating the shoes of a drum brake by means of a cable extending generally parallel to the axis of the brake drum. One such proposal has been to urge the shoes apart by a bell crank acting on one shoe and pivoted between the arms of a forked lever acting on the other shoe. The bell crank is connected to a cable and there is a substantially linear relationship between the cable movement and the shoe movement.

In accordance with the invention there is provided a cross-pull brake actuator for an internal shoe drum brake, comprising an input member for abutting engagement with one brake shoe of the drum brake and having means for connection to a cross pull member, a reaction member for abutting engagement with the other brake shoe of the brake, and a cam and follower means interposed between the two members to produce a relative displacement of the members for applying the brake shoes when an actuating force is applied through the cross-pull member to the input member, in use, in a direction generally parallel with the drum axis.

By altering the shape of the cam surface, the relationship between the cable movement and the shoe movement can be made non-linear. Thus for example, the cam shaping can be such as to provide a lower ratio initially for taking up shoe/drum clearance, and a higher ratio subsequently for applying maximum load.

Several embodiments of a cross-pull brake actuator in accordance with the invention will now be described, by way of example, with reference to the accompanying drawings in which.

Figure 1:
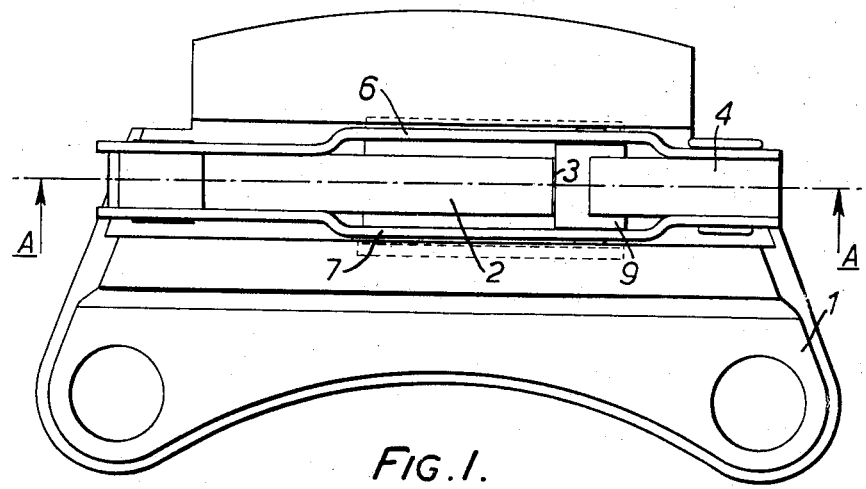
FIG. 1 shows a side elevation of one embodiment of cross-pull actuator.
Figure 2:
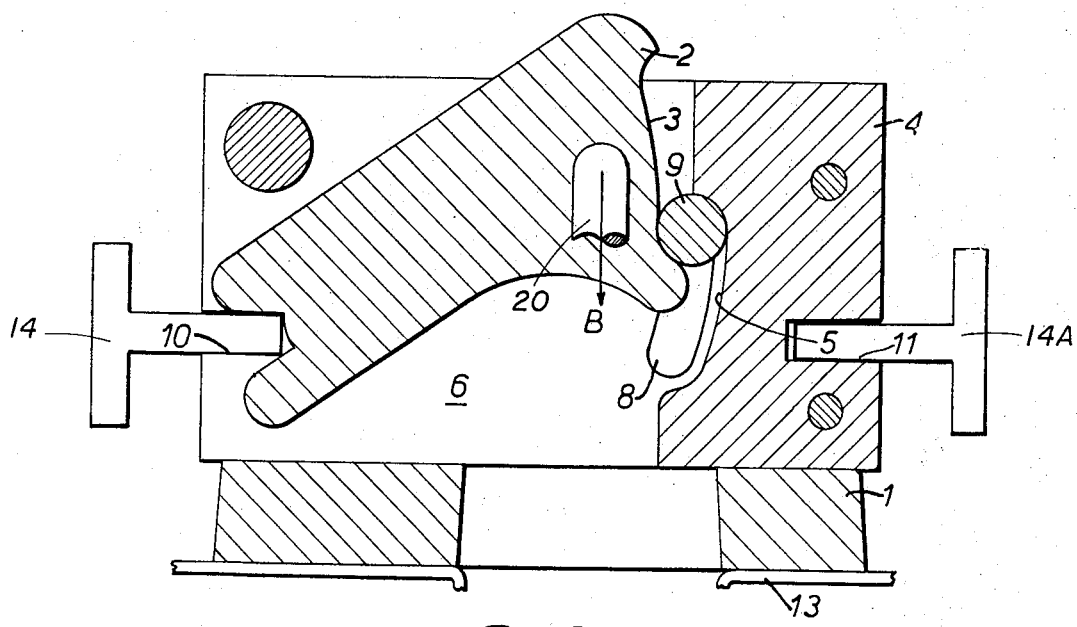
FIG. 2 is a plan view of the actuator taken along the line A—A of FIG. 1.
Figure 3:
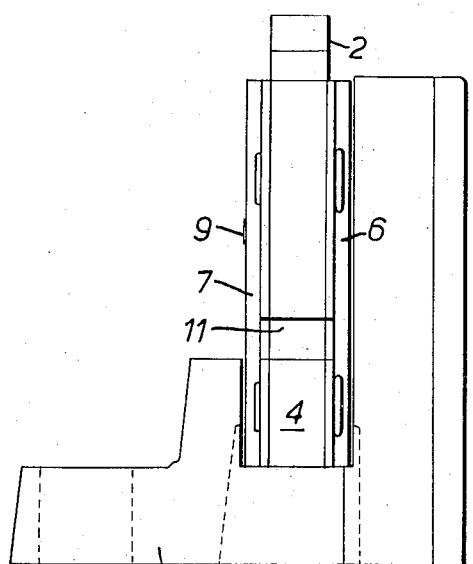
FIG. 3 is an end view of the actuator shown in FIGS. 1 and 2.

Referring to FIGS. 1 to 3 of the drawings, the cross-pull brake actuator comprises a housing 1, an input or cam member 2 having a cam surface 3, and a reaction member 4. The reaction member 4 comprises an abutment surface 5, and two side members 6 and 7 which extend along the length of the actuator on either side of the cam member 2 as shown. The side members 6 and 7 are provided with respective slots 8 in which are freely located the ends of a cylindrical roller 9.

In use, the housing of the actuator is secured to the back plate 13 of a drum brake, and the webs of opposed brake shoes 14, 4A are located in slots 10 and 11, respectively, in the reaction member 4. A cross-pull member constituted by a brake cable 20 is secured to the input member 2 and when pulled in the direction of the arrow B causes the left hand end of the cam member 2 (as viewed in FIG. 2) to pivot about the end of the web located in the slot 10. The resultant interaction between the cam surface 3, roller 9 and abutment surface 5 causes the reaction member 4 and the left hand end of cam member 2 to move apart relative to the housing 1, thereby applying the brake shoes to the interior of the drum.

Figure 4:
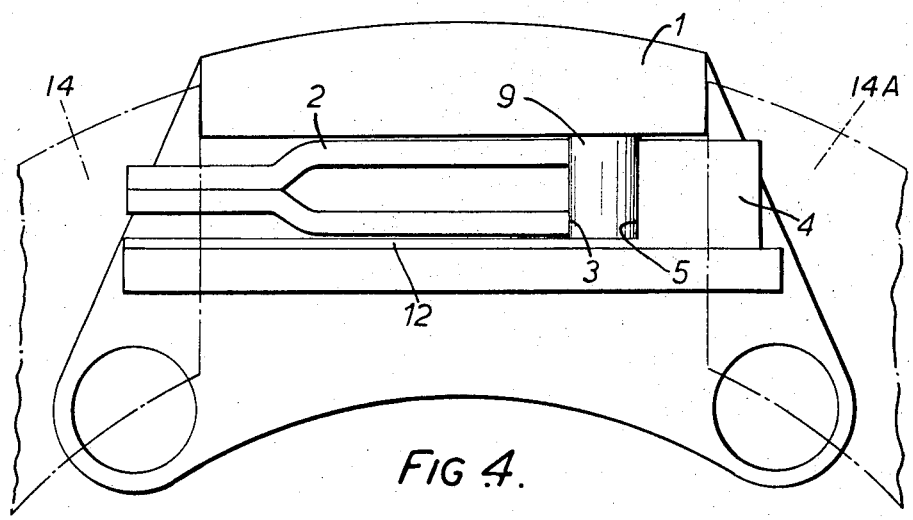
FIG. 4 shows a side elevation of a second embodiment of cross-pull actuator.

The second embodiment shown in FIG. 4 is the same as the embodiment described above except that the side members 6 and 7 are replaced by a single side member 12, the roller 9 being held laterally by the sides of a groove in the housing 1, and that the cam member 2 is bifurcated. This arrangement allows the actuator to be readily located in its recess on the housing 1 and means that a minimum of space is required for the adjuster, which is advantageous in small diameter drum brake assemblies.

Figure 5:
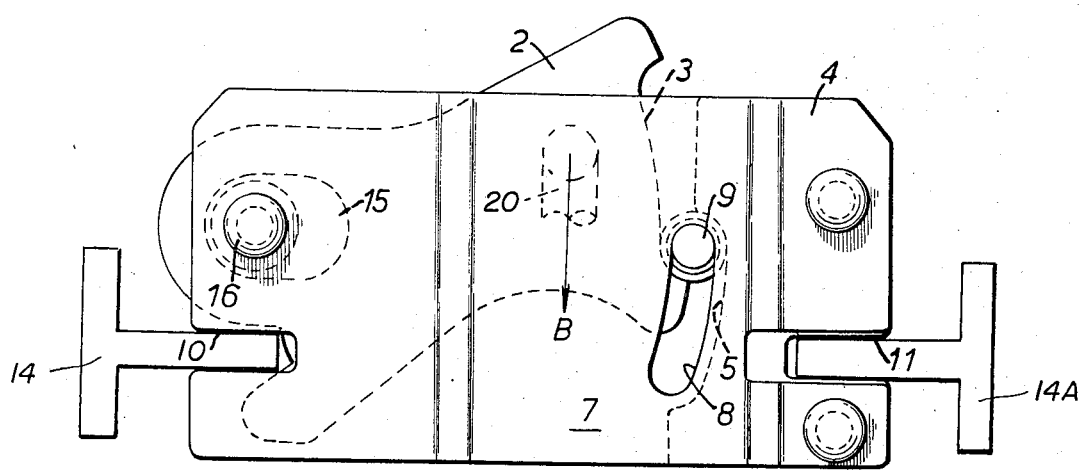
FIG. 5 is a side elevation of a third embodiment of cross-pull actuator.
Figure 6:
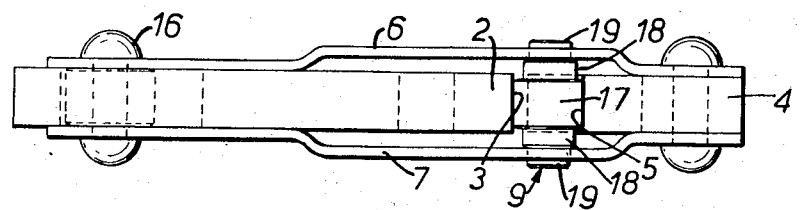
FIG. 6 is a plan view of the actuator shown in FIG. 5.

The embodiment shown in FIGS. 5 and 6 is generally similar to that shown in FIGS. 1 to 3 except that the input member 2 is slotted at 15 and embraces a rivet 16 passing through the side members 6 and 7 of the reaction member 4. This construction has the advantage that the components of the cross-pull actuator remain an integral unit when separated from the brake shoes. Furthermore, the roller 9 is stepped and comprises a first portion 17, second portions 19, and third portions 18. The first portion 17 has the largest diameter and is mounted in abutting engagement with surface 5 of reaction member 4. The third portions 18 act as spacers and maintain the second portions 19 in the slots 8 as shown. By using the stepped roller 9, a roller portion of large diameter abuts the cam surface 3, while the frictional area in contact with the sides of slots 8 is minimised.

Figure 7:
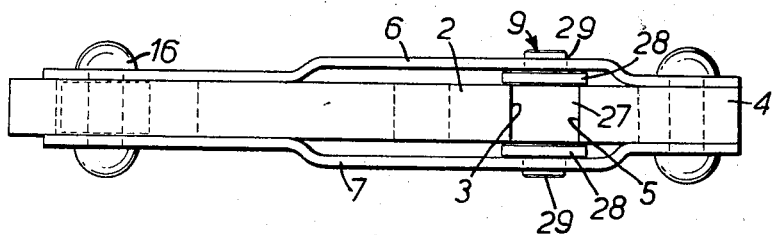
FIG. 7 is a plan view of a fourth embodiment of cross-pull actuator.

The actuator of FIG. 7 is generally similar to that shown in FIGS. 5 and 6 except that the roller 9 comprises portions 27, 28 and 29, the spacer portions 28 having the largest diameters. This arrangement minimises tilting of the roller 9.

In the embodiments described, the relationship between the cable movement and the shoe movement can be made non-linear by shaping the cam surface 3 or the abutment surface 5 engaged by the roller 9. Advantageously the shaping is such as to provide a low cable/shoe movement ratio initially for taking up the shoe/drum clearance, and a higher ratio subsequently for achieving maximum load.

In all of the above described embodiments, the arrangement is such that in use, when the actuator is mounted on the back plate of the brake, the reaction point between the roller 9 and the reaction member 4 is at its maximum distance from the back plate when the actuator is inoperative. The reaction point moves substantially into alignment with the reaction points on the brake shoe webs during operation of the actuator when maximum load is being transmitted to the shoes. This position of the reaction points in the fully operative condition of the actuator is desirable since only limited space is available between the shoe webs and the back plates.

It will be apparent that although the embodiments have been described with reference to a cylindrical roller, other equivalent roller means could be used, for example one or more balls suitably restrained to act between the cam surface 3 and the abutment surface 5.

Other forms of cam and follower means could, however, be utilised, for example a cam surface formed on either the input member 2 or the reaction member 4 and a slider member slidably mounted on the other member for cooperation with the cam surface. In such an arrangement the slider member and/or the cam surface could advantageously be provided with a coating of anti-friction material.

An advantage of the above-described actuators over known actuators in which forces are transmitted between the input and reaction members through a pin is that the friction between those members is considerably reduced, thus increasing the efficiency of the actuators.

I claim:

1. In or for an internal shoe drum brake having a pair of opposed brake shoes, a cross-pull brake actuator comprising an input member for abutting engagement with one of said brake shoes and adapted for connection to a cross-pull member a reaction member for abutting engagement with the other of said brake shoes, and cam and follower means interposed between the two members and responsive to an actuating force applied through said cross-pull member to the input member in a direction parallel with the axis of the drum to produce a relative displacement of the said members for applying the brake shoes, said cam and follower means comprising a cam surface formed in one of said members and roller means interposed between said cam surface and the other of said members.

2. An actuator according to claim 1, further comprising an abutment surface formed on the reaction member, and wherein said cam surface is formed on the input member, the roller means being arranged between the cam surface and the abutment surface.

3. An actuator according to claim 2, wherein the input member is adapted, in response to an actuating force, to cause the roller means to ride along the cam surface and abutment surface, whereby to move the reaction member in a direction perpendicular to said drum axis, and is adapted to undergo rotational movement about a point of reaction of the input member with its associated brake shoe and translational movement in a direction away from the reaction member.

4. An actuator according to claim 3, wherein the input member and the reaction member have points of reaction with their associated brake shoes which lie in a plane perpendicular to the drum axis, and wherein the point of reaction of the roller means with the cam surface is spaced from said plane in the inoperative position and lies substantially in said plane in the fully operative or maximum shoe displacement position.

5. An actuator according to claim 1, wherein the reaction member presents at least one slot in which one or each end of the roller means is located.

6. An actuator according to claim 5, wherein the roller means comprises a stepped roller having a first portion in abutting engagement with the reaction member and second portions slidable in said slots in the reaction member, the diameter of the first portion being greater than that of the second portions.

7. An actuator according to claim 6, wherein the roller has third portions intermediate the first and second portions and having a diameter greater than that of the second portions.

8. An actuator according to claim 7, wherein the diameter of the third portions is less than that of the first portion.

9. An actuator according to claim 1, further comprising a guide member secured to the reaction member, and wherein the input member presents a slot which embraces said guide member.

* * * * *